United States Patent [19]
Adl-Tabatabai et al.

[11] Patent Number: 6,093,216
[45] Date of Patent: Jul. 25, 2000

[54] METHOD OF RUN-TIME TRACKING OF OBJECT REFERENCES IN JAVA PROGRAMS

[75] Inventors: Ali-Reza Adl-Tabatabai; Guei-Yuan Lueh, both of Santa Clara, Calif.

[73] Assignee: Intel Corporation, Santa Clara, Calif.

[21] Appl. No.: 09/087,129

[22] Filed: May 29, 1998

[51] Int. Cl.[7] .............................. G06F 9/44; G06F 17/30
[52] U.S. Cl. ..................... 717/3; 717/4; 717/9; 707/206; 711/6; 711/165
[58] Field of Search .................................. 395/703, 704, 395/709; 707/206, 205; 711/170, 132, 133, 136, 165, 6; 710/56; 709/303; 717/3, 4, 9

[56] References Cited

U.S. PATENT DOCUMENTS

| | | | |
|---|---|---|---|
| 5,787,287 | 7/1998 | Bharadwaj ............................... | 395/708 |
| 5,845,298 | 12/1998 | O'Connor et al. ...................... | 707/206 |
| 5,848,423 | 12/1998 | Ebrahim et al. ......................... | 707/206 |
| 5,890,169 | 3/1999 | Wong et al. ............................. | 707/206 |
| 5,893,121 | 4/1999 | Ebrahim et al. ......................... | 707/206 |
| 5,903,899 | 5/1999 | Steele, Jr. ................................. | 707/206 |
| 5,909,579 | 6/1999 | Agesen et al. ........................... | 395/704 |

OTHER PUBLICATIONS

James Gosling, et al., The Java Language Specification, Published by Addison–Wesley, 1996, pp. 29–49.
Tim Lindholm, et al., The Java Virtual Machine Specification, Published by Addison–Wesley, 1997, pp. 57–82.
Alfred V. Aho, et al., Compilers—Principles, Techniques, and Tools, Published by Addsion–Wesley, 1988, pp. 1–24 and pp. 440–442.
Steven S. Muchnick, Advanced Compiler Design & Implementation, Published by Morgan Kaufmann, 1997, pp. 1–18, 319–328.
Douglas Kramer, The Java Platform—A White Paper, Published by Javasoft, 1996, pp. 6–24.
Richard Jones, et al., Garbage Collection—Algorithms for Automatic Dynamic Memory Management, Published by John Wiley & Sons, 1996, pp. 1–40, 75–95.

Hans–J. Boehm, "Simple Garbage–Collector–Safety," Proceedings of the ACM SIGPLAN '96 conference on Programming language design and implementation, pp. 89–98, May 1996.
Hans–J. Boehm, "Mark–sweep vs. copying collection and asymptotic complexity," 3–page [online], Presentation's paper at IWMM '95 [retrieved on Nov. 2, 1999]. Retrieved from the internet:<URL:ftp//parcftp.xerox.com/pub/gc/complexity.html>, 1995.
Chang et al., "Evaluation of an object–caching coprocessor design for object–oriented systems," Proceedings of the ICCD '93 IEEE International Conference on Computer Design: VLSI in Computers and Processors, pp. 132–139, Oct. 1993.
Henry G. Baker, "Efficient Implementation of Bit–vector Operations in Common Lisp," 14–page [online], 1990 [retrieved on Nov. 4, 1999]. Retrieved from the Internat:<URL:ftp://ftp.netcom.com/pub/hb/hbaker/Bitvectors.html>.

*Primary Examiner*—Paul R. Lintz
*Assistant Examiner*—Tuan Q. Dam
*Attorney, Agent, or Firm*—Peter Lam

[57] ABSTRACT

Many programming languages utilize reference pointers in computer code. Furthermore, some of these programming languages perform memory management in the form of garbage collection. Once such language is Java. During the execution of a garbage collection routine, the computer may need to locate all the variables containing reference values. The present invention introduces a method for run-time tracking of object references in computer code and determining which variables contain references to objects at garbage collection sites. The method of the present invention first creates a bit vector in memory. The bit vector is then initialized. Second, each variable declared in the computer program that may be used to store a reference value is assigned a unique bit within this bit vector. Each bit is maintained to indicate whether the variable it is assigned to is currently storing a reference value. Specifically, when a variable is assigned a reference value, the corresponding bit in the bit vector is set. When a variable is assigned a non-reference value, the corresponding bit in the bit vector is cleared.

39 Claims, 8 Drawing Sheets

METHOD OF RUN-TIME TRACKING OF OBJECT REFERENCES IN JAVA PROGRAMS

BACKGROUND OF THE INVENTION

1. Field of the Invention

This invention relates to the field of computer software optimization. More particularly, the present invention relates to a method for run-time tracking of object references in computer code.

2. History of the Prior Art

Computer programs are generally created as source code. The source code is then compiled into object code for execution. Programs generally exist as compiled object code in computer systems. The compiled code is usually designed to operate on only one particular operating system or on only one particular computer processor architecture. In order to use a certain program on several different computer architectures, the original source code must be compiled into object code for each different operating system and each different computer processor architecture.

In recent years, the popularization of the World Wide Web has created a problem for software developers trying to build software for networked consumer devices. Millions of people around the world are surfing the Internet and browsing web pages with their computers. However, not all of the computers are of the same type. For instance, a person may be using a Macintosh, a PC, or a UNIX machine. Computer programs need to be designed to support multiple host architectures and to allow secure delivery of its software components. As a result, Sun Microsystems, Inc., introduced Java, a general purpose concurrent object oriented programming language. Java was designed such that Java code could survive transport across networks, operate on any client, and assure the client that it was safe to run.

Java is a strongly typed programming language. A program is created by compiling source code written in Java's well defined format into Java bytecodes. Compilation normally consists of translating Java programs into a machine independent bytecode representation. Bytecodes are executed by a runtime interpreter residing on the client computer. Run time activities include loading and linking the classes needed to execute a program, optional machine code generation and dynamic optimization of the program, and actual program execution.

Java bytecodes are designed to execute on a Java Virtual Machine. The Java Virtual Machine is an abstract computing machine that has an instruction set and uses various memory areas. A Java Virtual Machine is not an actual hardware platform, but rather a low level software emulator that can be implemented on many different computer processor architectures and under many different operating systems. The Java Virtual Machine reads and interprets each bytecode so that the instructions may be executed by the native microprocessor. Hence a compiled Java bytecode is capable of functioning on any platform that has a Java Virtual Machine implementation available. However, bytecode interpretation detracts from processor performance since the microprocessor has to spend some of its processing time interpreting bytecode instructions. "Just in Time" (JIT) compilers were introduced to improve the performance of Java Virtual Machines. A JIT compiler translates Java bytecodes into the processor's native machine code during runtime. The processor then executes the compiled native code like any other native program. Such compiled Java programs execute much faster than Java programs that are executed using a Java interpreter.

Java was derived from the C++ programming language. Java includes some other important features from garbage collected languages (e.g., Smalltalk and LISP)—including automatic memory storage management. Garbage collected languages, such as Java, allow the system (garbage collector) to take over the burden of memory management from the programmer. When a program runs low on heap space, the garbage collector (GC) determines the set of objects that program may still access. This set of objects are known as live objects. The space used by objects that will no longer be accessed ("dead objects") is freed by the garbage collector for future use.

There are many algorithms for performing garbage collection. One type of garbage collection is called conservative garbage collection. In conservative garbage collection, the garbage collector searches for a set of live objects, but does not move the objects it finds. The set of live objects (root set) includes live objects that exist in global variables, in registers, and on the runtime stack. The GC simply marks the objects as live without checking whether the objects are references. Another type of garbage collection is precise garbage collection. In precise garbage collection, the root set must all contain reference values or be initialized, or else memory errors will result. This is because precise garbage collection compacts the memory space by moving all the objects it finds to another memory region. The values in the root set must contain reference values since the garbage collector copies and moves the objects pointed to by references. If a value is mistakenly considered a reference value when it is not, a wrong piece of data will be moved and program errors may occur.

SUMMARY OF THE INVENTION

The present invention introduces a method for run-time tracking of object references in computer code. The method of the present invention first creates a bit vector in memory. The bit vector is then initialized. Second, each variable declared in the computer program that may be used to store a reference value is assigned a unique bit within this bit vector. Each bit is maintained to indicate whether the variable it is assigned to is currently storing a reference value. Specifically, when a variable is assigned a reference value, the corresponding bit in the bit vector is set. When a variable is assigned a non-reference value, the corresponding bit in the bit vector is cleared.

Other objects, features, and advantages of the present invention will be apparent from the accompanying drawings and from the detailed description that follows.

BRIEF DESCRIPTION OF THE DRAWINGS

The present invention is illustrated by way of example and not limitations in the figures of the accompanying drawings in which like references indicate similar elements, and in which.

DETAILED DESCRIPTION

A method for run-time tracking of object references in compiled computer code is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to Java object-oriented programming language. Although the following embodiments are described with reference to the Java programming language, Java "Just-In-Time" (JIT) compilers, and garbage collection, other embodiments are applicable to other types of programming languages that use object references or memory management. The same techniques and teachings of the present invention can easily be applied to other types of compiled object code.

An intended advantage of one of more embodiments described below is the runtime tracking of object references in a program. Another intended advantage is the runtime determination of which variables contain references to objects at garbage collection sites. Other intended advantages of one or more embodiments may include elimination of fragmented memory and improvement of locality.

A Computer System Application

Figure 1:
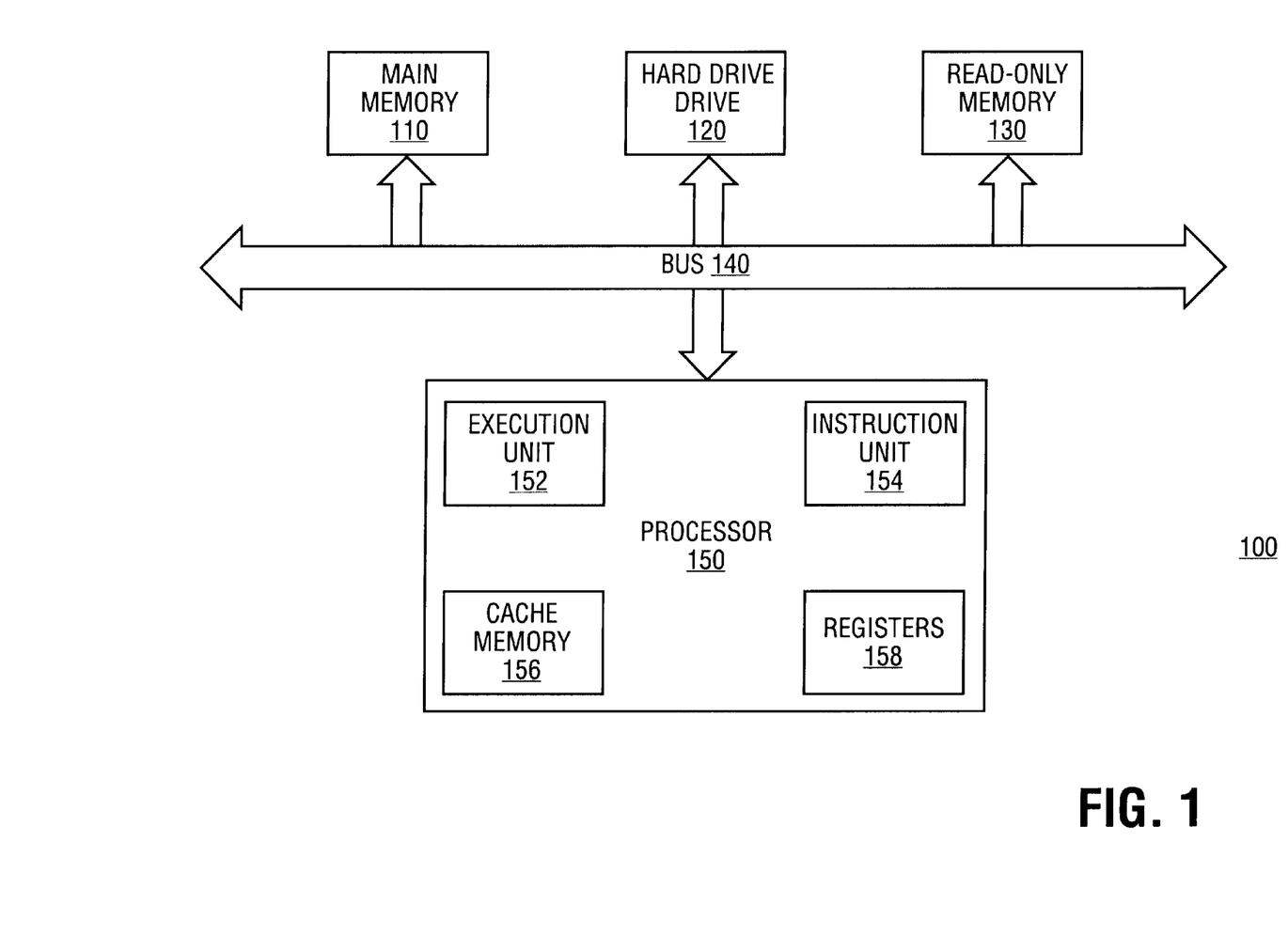
FIG. 1 is a block diagram illustrating a computer system which may utilize the present invention.

Referring now to FIG. 1, there is a block diagram illustrating a computer system 100 which may utilize the present invention. The system 100 includes a central processor 150 which carries out the various instructions provided to the computer 100 for its operations. The central processor 150 comprises of an execution unit 152, an instruction unit 154, cache memory 156, and general registers 158. The central processor 150 is joined to a bus 140 adapted to carry information to various components of the system 100. Joined to the bus 140 is main memory 110 which is typically constructed of dynamic random access memory arranged in a manner well known to those skilled in the prior art to store information during a period in which power is provided to the system 100. Also joined to the bus 140 is read-only memory 130 which may include various memory devices well know to those skilled in the art each of which is adapted to retain a particular memory condition in the absence of power to the system 100. The read-only memory 130 typically stores various basic functions used by the processor 150 such as basic input/output processes and startup processes typically referred to as BIOS processes. Also connected to the bus 140 long term memory 120. The construction and operation of long term memory 120, typically electromechanical hard disk drives, is well known to those skilled in the art.

Running a Java Class File

Figure 2A:
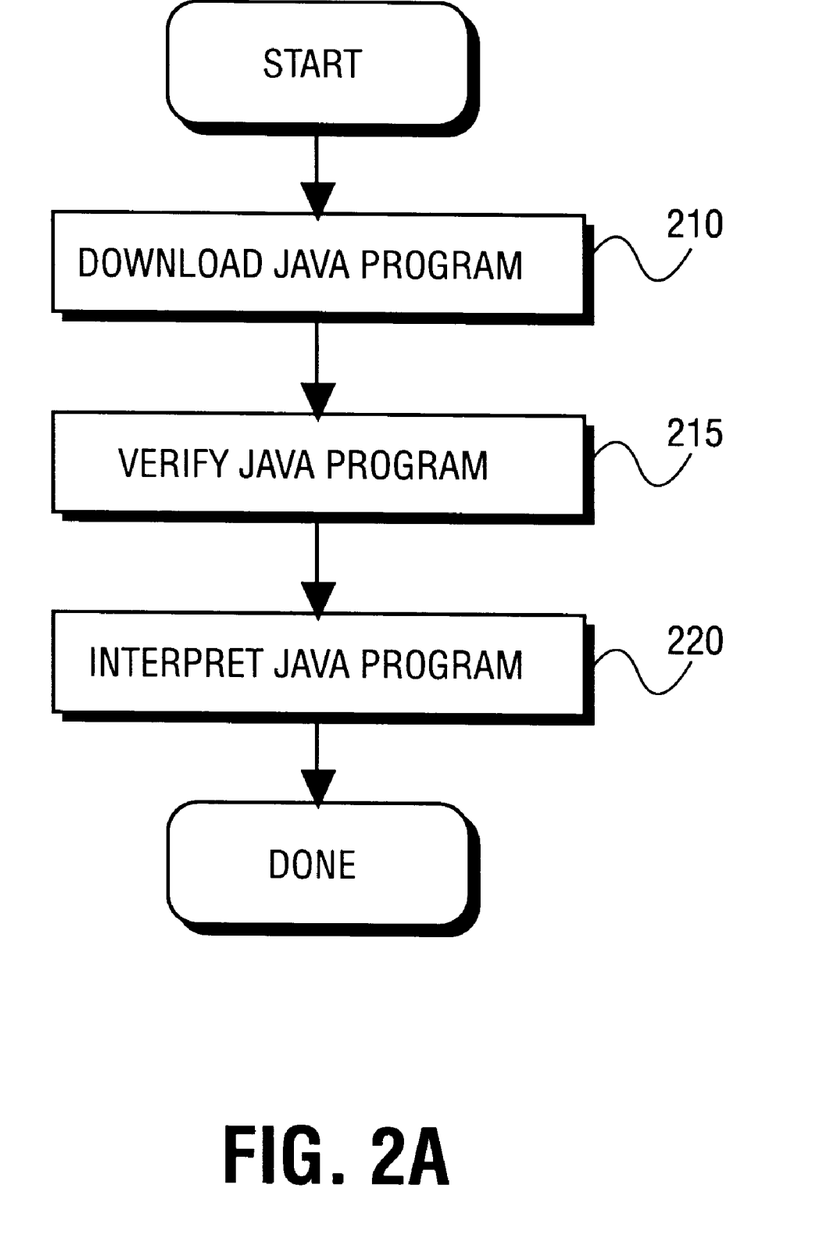
FIG. 2a illustrates the list of steps in downloading and running a Java program in a Java Virtual Machine with an interpreter.
Figure 3:
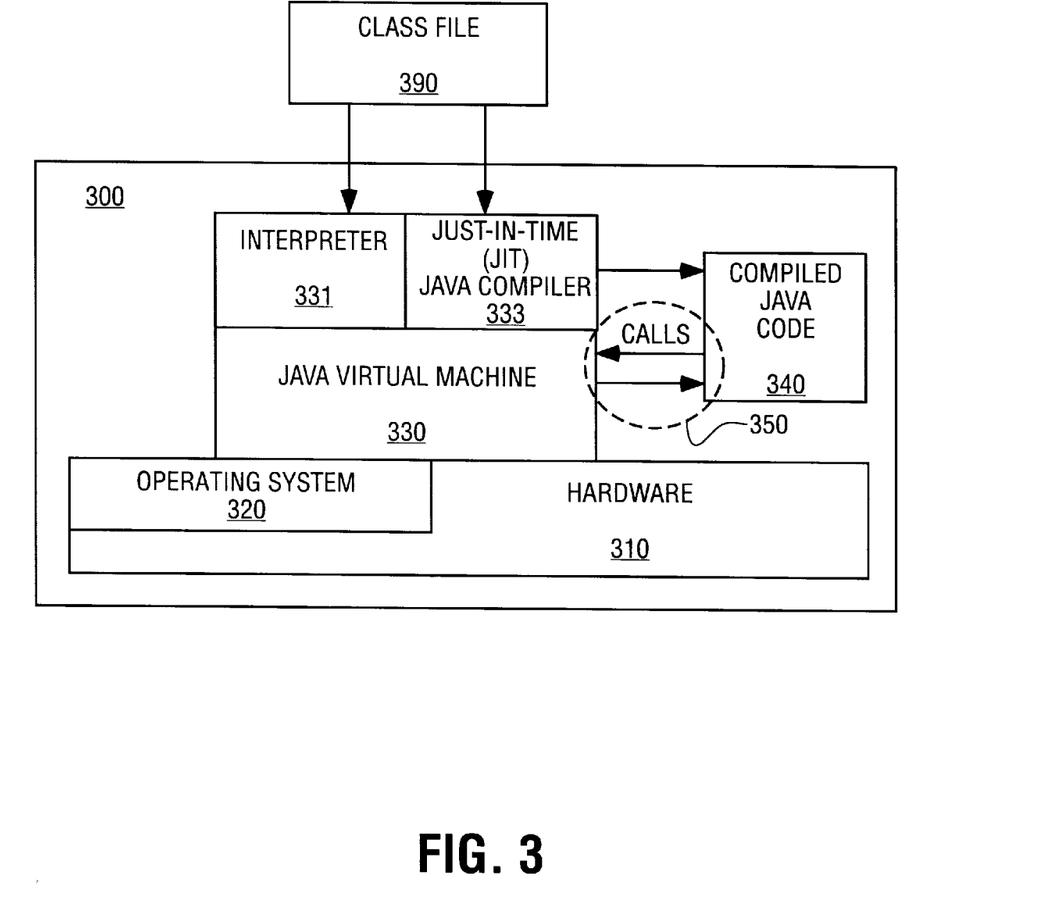
FIG. 3 illustrates a block diagram of a Java Virtual Machine on a client computer system.

An example of running a Java program in a networked computer environment is provided with reference to FIG. 2a and FIG. 3. FIG. 2a illustrates the list of steps in downloading and running a Java program in a Java Virtual Machine with and interpreter. FIG. 3 illustrates a block diagram of the elements in a client computer system 300 equipped to interpret Java class files. The client computer system 300 includes computer hardware 310 controlled by an operating system 320. The system 300 also includes a Java Virtual Machine implementation 330 for running Java class files 390. The Java Virtual Machine 330 running on the client computer system 300 relies on services from the underlying operating system 320 and the computer hardware 310. Furthermore, the Java Virtual Machine 330 uses a Java Interpreter 331 to interpret Java class files 390.

In a networked environment, a user has to first access a computer server through the network and download the desired Java class file 390 into a client computer system 300 as stated in step 210 of FIG. 2a. After the class file 390 has been downloaded, it is passed into the Java Virtual Machine 330, which then verifies the downloaded class file at step 215. Step 215 of verifying the class file is to ensure that the program will not cause security violations nor will it cause harm to the computer system resources. After the Java class file has been verified, the interpreter 331 begins interpreting the Java byte codes of the class file. The Java program bytecodes are interpreted in step 220 so that the Java application can be executed. Since the bytecodes interpreted are generally nonnative to the processor, the interpretation process tends to be slow. Hence, Java "Just-In-Time" (JIT) compilation was introduced to improve the performance of Java programs.

Figure 2B:
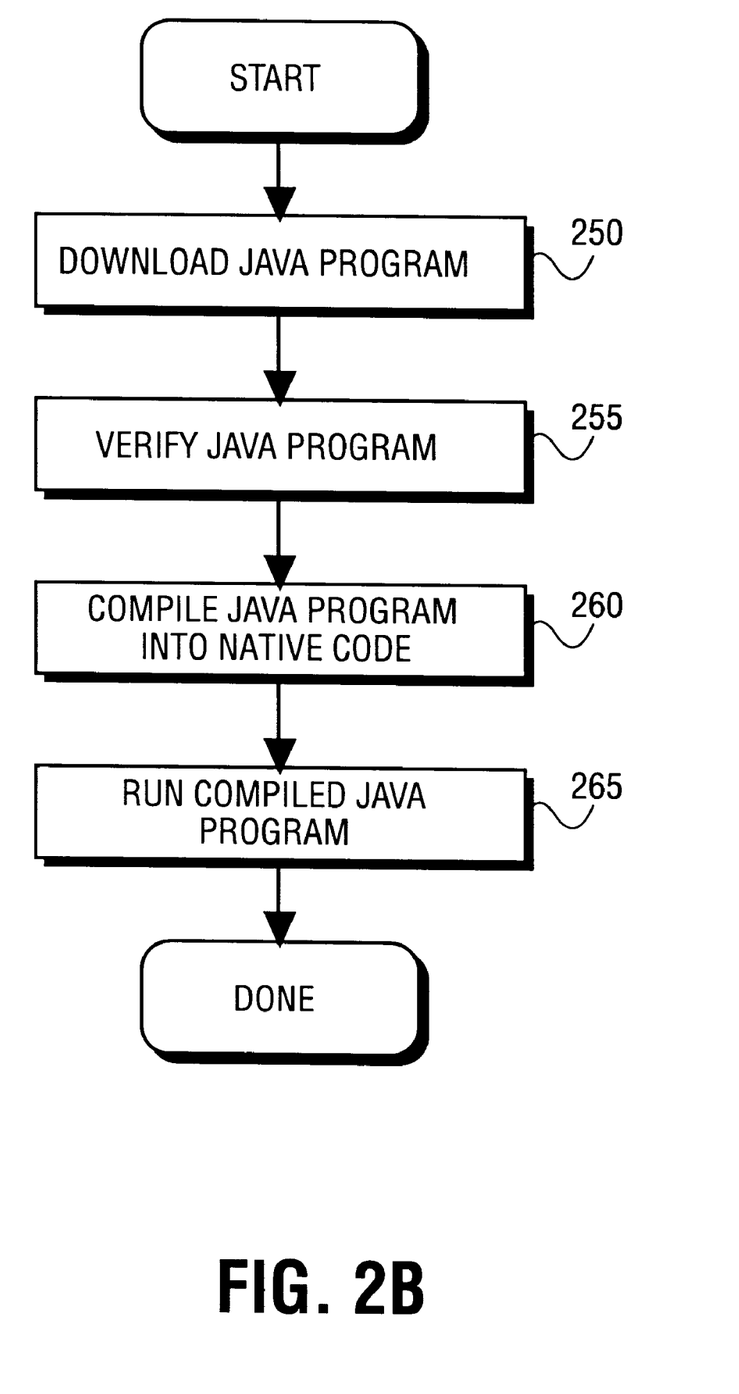
FIG. 2b illustrates a flow diagram that lists the steps of downloading, compiling, and running a Java program in a Java Virtual Machine that compiles the code before execution.

FIGS. 2b and FIG. 3 are used to describe how a Java program can be compiled and then executed. FIG. 2b illustrates a flow diagram that lists the steps of downloading, compiling, and running a Java program in a Java Virtual Machine that compiles the code before execution. First, a user accesses a Java class file 390 on a computer network and downs the class file to a local client computer system 300 as in step 250. Then at step 255, the Java Virtual Machine 330 verifies the downloaded class file. After the Java program has been verified, a Java "Just-In-Time" (JIT) compiler 333 compiles the Java class file and generates compiled Java code 340 in the form of native processor code at step 260. This compiled Java code 340 is then directly executed on the computer hardware 310 at step 265. Such compiled Java programs execute much faster than Java programs that are executed using a Java interpreter because the compiled code is native to the computer processor. In order to maintain the state of the Java Virtual Machine 330, the compiled Java code 340 makes calls 350 into the Java Virtual Machine.

Using Run-Time Tracking of Object References

Figure 4A:
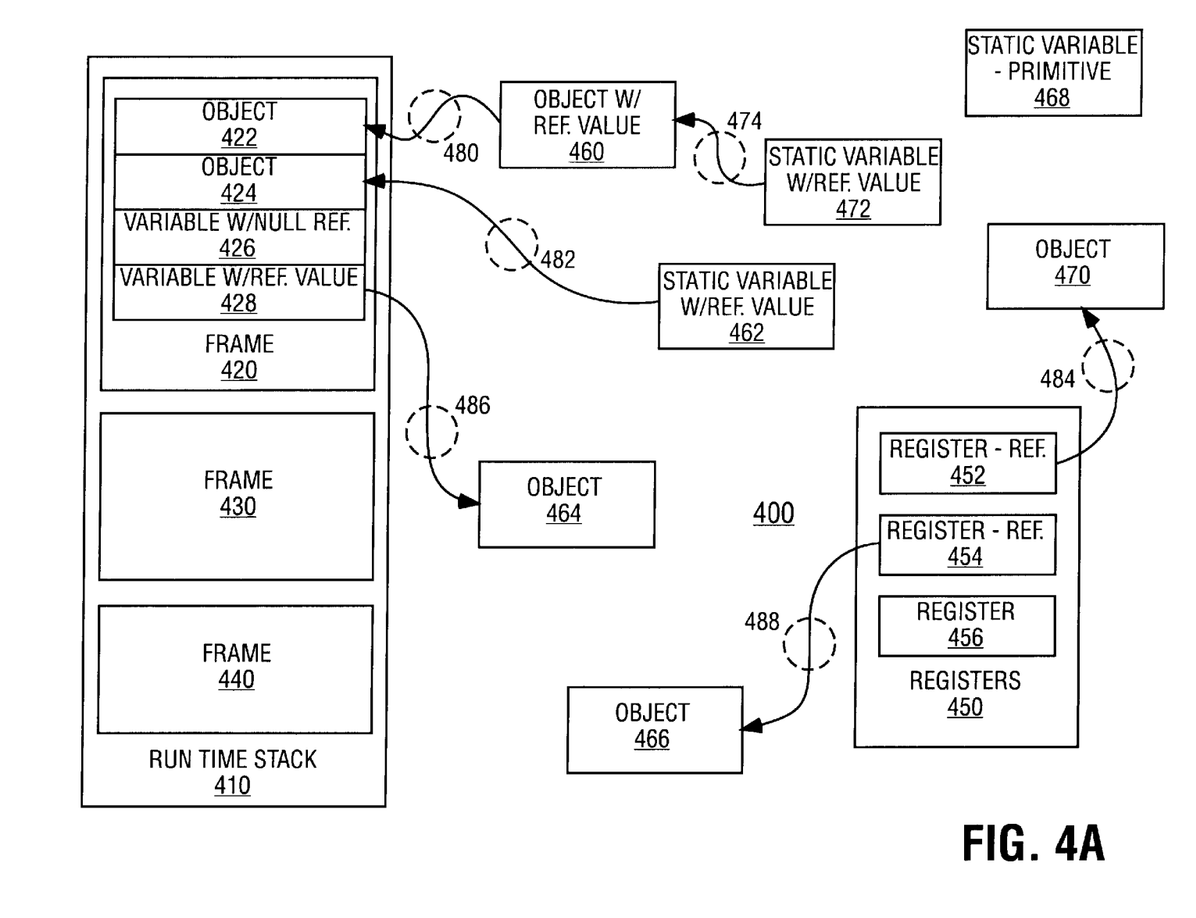
FIG. 4a is a block diagram illustrating the use of memory space in a computer system in one embodiment of the present invention.

FIG. 4a is a block diagram illustrating the use of memory space in a computer system in one embodiment of the present invention. The memory space 400 in FIG. 4a comprises of a run-time stack 410, registers 450, static variables (462, 468, 472) and objects (460, 464, 466, 470) on the heap. The run-time stack 410 may further comprise of a plurality of activation frames (420, 430, 440) for various program functions and methods. These activation frames are used as working space for functions and methods called during execution of the Java program. During program execution, numerous objects or variables may be declared and used within the program. An object, also referred to as a cell or node, is a run-time notion; any object is an instance of a certain class, created at execution time and made of a number of fields. An object may be a dynamically created class instance or an array or an individually allocated piece of data. An object is assumed to be a contiguous array of bytes or words, divided into fields. A field may contain a pointer or a non-pointer value.

Reference values (often just references) are pointers to these objects and a special null reference, which refers to no object. However, reference values do not point to primitives or non-reference values. An object is created in the Java heap, and is garbage collected after there are no more references to it. However, there may be many references to the same object. A variable is a storage location and may be of a primitive type or reference type. A variable always contains a value that is assignment compatible with its type. A variable of a primitive type always holds a value of that exact primitive type. The primitive types are the boolean type and the numeric types. A primitive type may hold a primitive value such as boolean, byte, short, int, long, and float. A variable of reference type can hold either a null reference or a reference to any object whose class is assignment compatible with the type of the variable. The reference types are class types, interface types, and array types. There is also a special null type.

Objects may be stored in memory locations within the heap memory. Some program variables may be declared as global (or static) variables (462, 468, 472). Objects may contain non-reference values (or primitive values) such as integers, floating point values, doubles, and long integers. Objects may also contain reference values (pointers) that point or refer to other variables or objects. In FIG. 4a, there are a few variables containing reference values. Variable 428 in stack frame 420 refers to object 464. Meanwhile, variable 426 contains a null reference. Variables in a register 450 or a static variable (462, 472) may also contain reference values. For instance, static variable 462 points to object 424. Then reference value in static variable 472 refers to object 460, which contains a reference value and is in turn referring to an object 422. The reference value in register 454 points to an object in variable 466. Variable 468 may be a static variable of type primitive created in the heap.

Figure 5A:
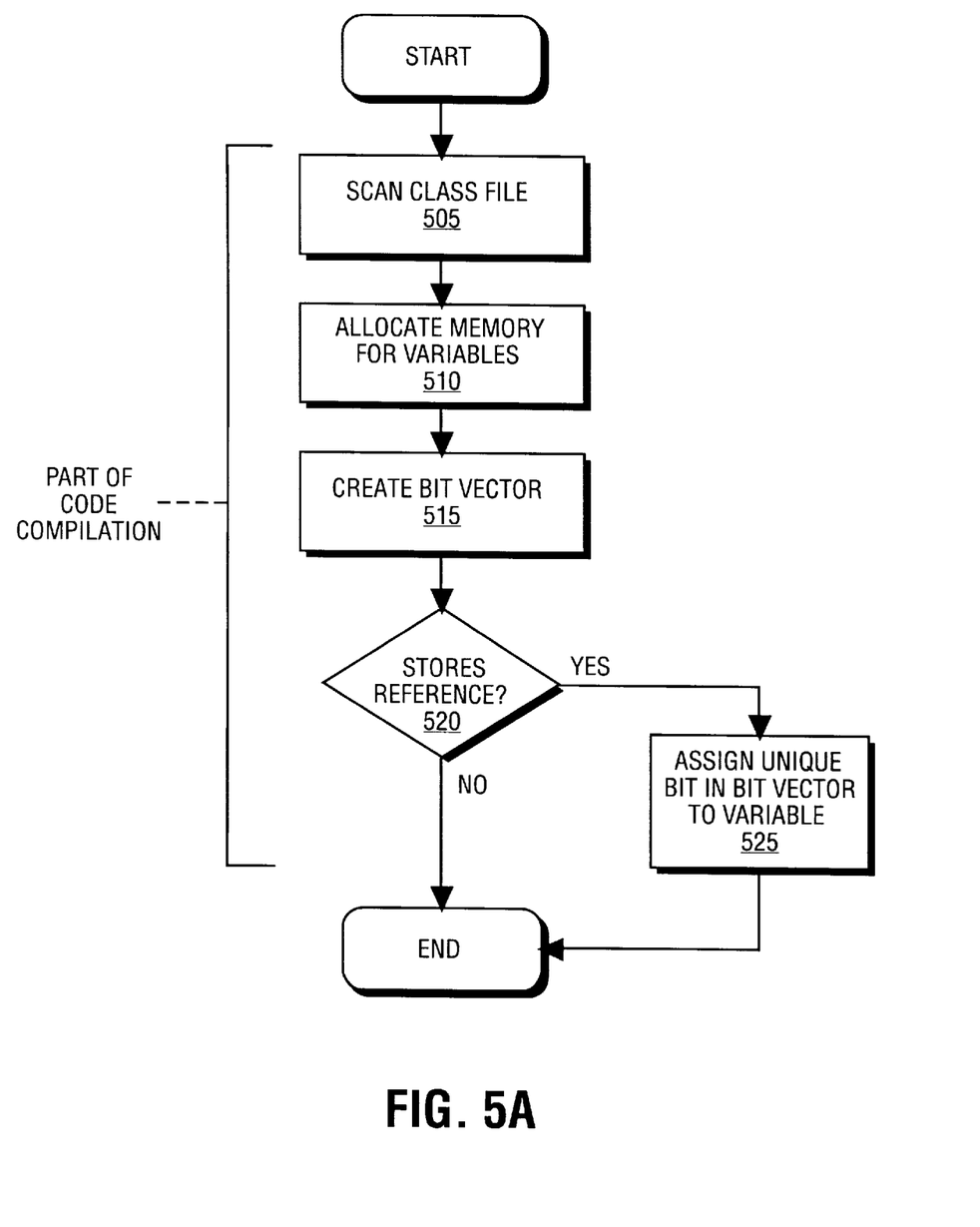
FIG. 5a is a flow chart illustrating one embodiment of the present invention used during the steps of computer code compilation.
Figure 5B:
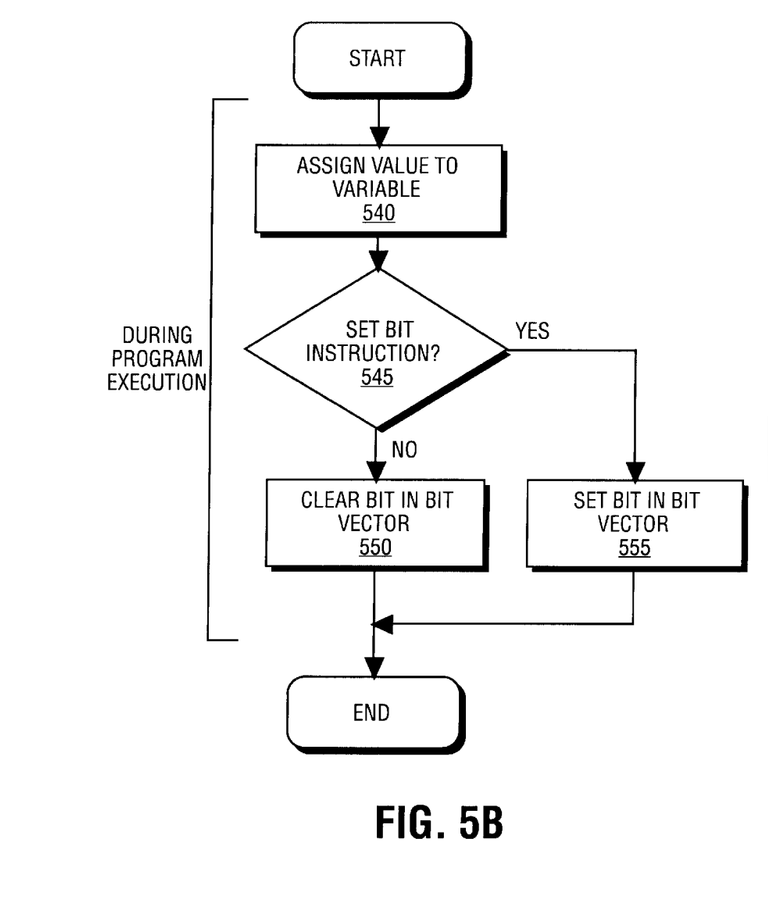
FIG. 5b is a flow chart illustrating one embodiment of the present invention during the steps of program execution.
Figure 5C:
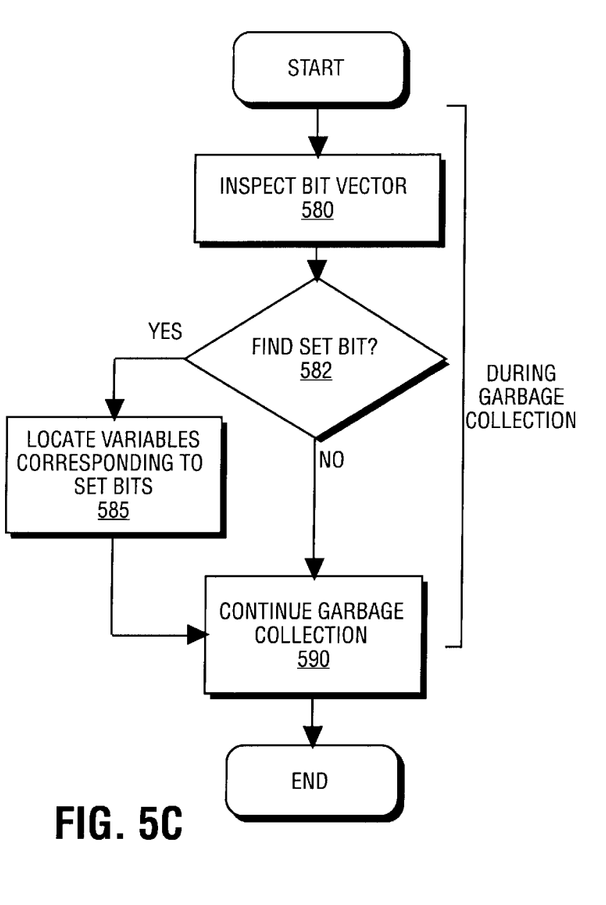
FIG. 5c is a flow chart illustrating one embodiment of the present invention during the steps of garbage collection.

FIGS. 5a, 5b, and 5c are used to illustrate how one embodiment of the present invention may be used during the compilation and execution of a Java program. FIG. 5a is a flow chart illustrating one embodiment of the present invention used during the steps of computer code compilation. FIG. 5b is a flow chart illustrating one embodiment of the present invention during the steps of program execution. FIG. 5c is a flow chart illustrating one embodiment of the present invention during the steps of garbage collection. The present embodiment of the invention uses dynamic tagging in a JIT compiler. However, dynamic tagging may also be used in an interpreter in another embodiment of the present invention.

FIG. 5a shows some of the steps taken by the JIT compiler during compilation of computer code. In step 505, the compiler first scans the Java class file. Then at step 510, the JIT compiler allocates memory space for the program. The memory space is used for program execution and for storing objects declared in the code. Objects may be assigned space on the heap, runtime stack, cache, or physical machine registers. The JIT compiler knows when objects are assigned and become references. Objects may be used to store variables of types such as integer, character, float, and double. However, Java bytecodes have "ambiguous types" where the same variable may hold reference and non-reference values at different times during the execution of the method. A method is essentially a function or procedure in the program.

Figure 4B:
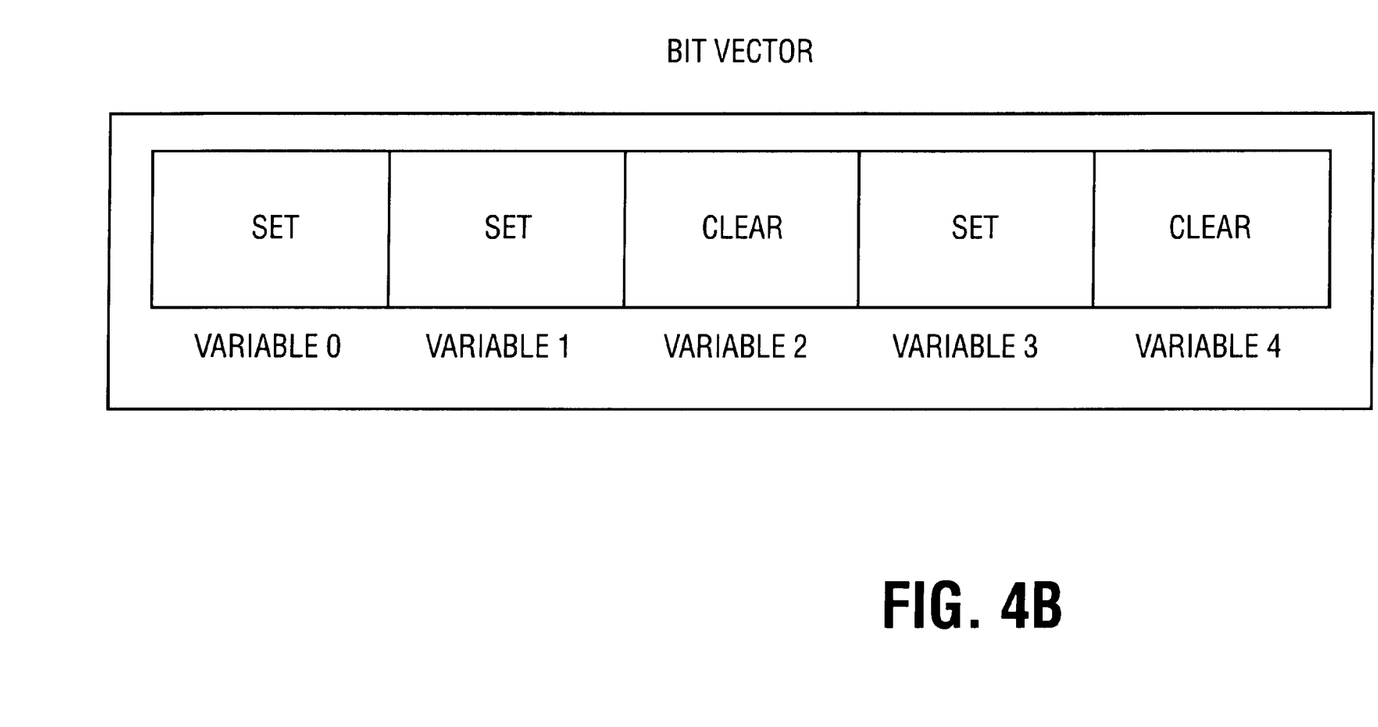
FIG. 4b is a block diagram illustrating the use of a bit vector in one embodiment of the present invention.

The present invention performs dynamic tagging by maintaining a bit vector that is dynamically updated on every write to an ambiguously-typed variable. FIG. 4b is a block diagram illustrating the use of a bit vector in one embodiment of the present invention. In FIG. 4b, the bit array shown contains room for bits indicating the state of five variables—Variables 0 through 5. In the present embodiment, a bit is set when the corresponding variable contains a reference type. For instance, in FIG. 4b, Variables 0, 1, and 3 have bits set. But when the corresponding variable does not contain a reference type, then the bit is cleared, as in the case of Variables 2 and 4. A bit vector is created for all the objects in the method at step 515 of FIG. 5a. During compile time, the JIT compiler reserves memory space for this bit vector. In the present embodiment, the bit vector is stored in the activation frame. In another embodiment, the bit vector may also be stored in a method's local stack frame or elsewhere in the memory space. By creating an array of bits to store the tags instead of using a bit within the variable's 32-bit word, integer arithmetic precision is preserved. This is important because the semantics of Java clearly state that all integer arithmetic is on full 32 bit integer values. To improve performance in accessing the bit vector, the bit vector may be stored in registers. At step 520, the compiler checks to see if a variable will ever be assigned a reference value. If the variable may store a reference type, then it is assigned a unique bit in the bit vector at step 525. The JIT compiler also inserts an instruction that will set that variable's corresponding bit in the bit vector if the variable may store a reference type. But if the variable will not contain a reference type, then the JIT compiler will insert after assignment the variable, an instruction that clears the corresponding bit in the bit vector. In the present embodiment, the values of all bits within the bit vector are initialized at the beginning of the method during program execution time.

FIG. 5b shows some of the steps taken during program execution in making assignments to variables. A JIT compiler runs as part of the application. During execution of a Java program, a runtime stack is created and new assignments may be made to a variable as in step 540. As noted above, the JIT checked variable V at compile time to see if the variable would contain a reference value and inserted either a "set" or "clear" instruction after the assignment. During runtime, memory space is allocated for the bit vector from the runtime stack and the bits in the bit vector are either set or cleared at the entry to a method. Each time variable V is assigned, the JIT will see the earlier inserted instruction to either set or clear the variable's corresponding bit in the bit vector. If the variable is assigned a reference value, the instruction following the assignment would be a "set" and the corresponding bit for V is set at step 555. And each time V is assigned a non-reference value, the instruction following the assignment would be a "clear" and the corresponding bit for V is cleared at step 550.

The tags in the bit vector are used at garbage collection time to decide which variables actually hold valid references. The garbage collector (GC) needs to discover which variables contain reference values and compute the root set. The root set includes live objects that exist in global variables, in registers, and on the runtime stack. The garbage collector first computes the root set by checking for live objects in the set of references located in global variables, in registers, and on the runtime stack. The GC then locates all the references that can be reached from the root set by traversing the graph of reachable objects. Some GC algorithms (conservative GC) just check objects to see if it is live and marks it accordingly. Other GC algorithms (precise GC) move live objects to a new place in memory to eliminate fragmentation and improve locality. In order to support GC algorithms that move live objects, the root set must be precise; that is, the root set must contain only references to objects.

Computing the root set accurately requires the cooperation of the compiler. Only the compiler is capable of precisely locating references held by local variables and temporaries, both of which can be assigned to stack locations or registers. As for global variables, the garbage collector can keep track of the Java classes that have been loaded and determine whether the set of global variables contain reference values without support from the compiler. The compiler can keep track of Java operand stack locations that contain references by statically computing a type bit vector for each GC site, using a simple and fast depth-first traversal of the Java bytecodes. The bit vector marks those stack locations that contain references at the GC site. However, Java programs may contain variables of "ambiguous types". A variable of "ambiguous type" may contain reference and non-reference values at different times during the execution of the method. Therefore, statically computing the set of variables containing references at garbage collection sites in Java is not trivial. During garbage collection, a Java JIT must be able to distinguish between variables containing references and those that do not without any ambiguity.

FIG. 5c is a flow chart illustrating one embodiment of the present invention during the steps of garbage collection. During garbage collection, the program is stopped. The GC checks trees, pointers, and references to find reachable objects. A root set of initial reachable objects is constructed. The root set may include a set of pointers to objects in registers or on the runtime stack. The GC would then traverse the graph of reachable objects starting from the root set. The present invention allows the GC to know which variables contain reference values and easily find the root set. At step 580, the garbage collector inspects the bit vector. If the GC finds set bits at step 582, the garbage collector looks at the variable mapping from the compiler to determine which variable the particular bit is assigned and where the variable is located as in step 585. Once all the set bits are checked, the GC continues the garbage collection routine at step 590. If the GC does not find any set bits in the bit vector, then the garbage collector knows that none of the local variables contain valid reference values and continues its routine as in step 590.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative than a restrictive sense.

What is claimed is:

1. A method for run-time tracking of object references in computer code comprising:
   creating a bit vector in computer memory, said bit vector having at least one bit;
   assigning a bit within said bit vector for each ambiguously typed variable;
   maintaining said bit dynamically during code execution to indicate whether said variable is assigned a reference value; and
   scanning said bit vector during garbage collection to determine which ambiguously typed variables contain reference values.

2. The method of claim 1 further comprising creating a runtime stack.

3. The method of claim 1 wherein creating a bit vector comprises allocating memory space in a method's local stack frame.

4. The method of claim 1 wherein creating a bit vector comprises initializing all bits in said bit vector.

5. The method of claim 4 wherein initializing comprises setting a corresponding bit in said bit vector for a variable containing a reference value.

6. The method of claim 4 wherein initializing comprises clearing a bit corresponding in said bit vector for a variable containing a non-reference value.

7. The method of claim 1 wherein creating a bit vector comprises reserving space in computer memory for said bit vector.

8. The method of claim 1 wherein maintaining a bit within said bit vector for each variable further comprises inserting a set bit instruction after instruction assigning variable if said variable contains a reference value.

9. The method of claim 1 wherein maintaining a bit within said bit vector for each variable further comprises inserting a clear bit instruction after instruction assigning variable if said variable contains a non-reference value.

10. The method of claim 1 wherein maintaining a bit within said bit vector for each variable comprises assigning a unique bit within said bit vector for each variable assigned a reference type.

11. The method of claim 1 wherein maintaining said bit to indicate whether said variable is assigned a reference value comprises setting said bit when said variable is assigned a reference value.

12. The method of claim 1 wherein maintaining said bit to indicate whether said variable is assigned a reference value comprises clearing said bit when said variable is assigned a non-reference value.

13. The method of claim 1 wherein each variable is a local variable.

14. A method for memory management comprising:
   run-time tracking of object references comprising:
      creating a bit vector;
      assigning a bit within said bit vector for each ambiguously typed variable; and
      maintaining said bit dynamically during code execution to indicate whether said ambiguously typed variable is assigned a reference value;
   computing a set of live objects; and
   freeing space used by dead objects.

15. The method of claim 14 wherein creating a bit vector comprises allocating memory space in a method's local stack frame.

16. The method of claim 14 wherein creating a bit vector comprises initializing all bits in said bit vector.

17. The method of claim 16 wherein initializing all bits in said bit vector comprises:
   setting a corresponding bit in said bit vector for a variable containing a reference value; and
   clearing a bit corresponding in said bit vector for a variable containing a non-reference value.

18. The method of claim 14 wherein assigning a bit within said bit vector for each ambiguously typed variable comprises assigning a unique bit within said bit vector for each ambiguously typed variable assigned a reference type.

19. The method of claim 14 wherein assigning a bit within said bit vector for each ambiguously typed variable further comprises:

inserting a set bit instruction after instruction assigning variable if said variable contains a reference value; and inserting a clear bit instruction after instruction assigning variable if said variable contains a non-reference value.

20. The method of claim 14 wherein maintaining said bit to indicate whether said ambiguously typed variable is assigned a reference value comprises setting said bit when said variable is assigned a reference value.

21. The method of claim 14 wherein maintaining said bit to indicate whether said ambiguously typed variable is assigned a reference value comprises clearing said bit when said variable is assigned a non-reference value.

22. The method of claim 14 wherein computing a set of live objects further comprises:

examining global variables, registers, and a run-time stack; and locating all references that can be reached from said set of live objects.

23. The method of claim 22 wherein examining a run-time stack comprises examining said bit vector.

24. The method of claim 22 wherein locating all references that can be reached from said set of live objects comprises traversing a graph of reachable objects.

25. A digital processing system having a processor operable to perform the steps of:

creating a bit vector having at least one bit, said bit vector to store states of ambiguously typed variables;

initializing said bit vector;

assigning a bit within said bit vector for each ambiguously typed variable; and maintaining said bit dynamically during code execution to indicate whether said variable is assigned a reference value.

26. A digital processing system of claim 25 wherein assigning comprises assigning a unique bit within said bit vector for each variable assigned a reference type.

27. A digital processing system of claim 25 wherein maintaining said bit to indicate whether said variable is assigned a reference value comprises setting said bit when said variable is assigned a reference value.

28. A digital processing system of claim 25 wherein maintaining said bit to indicate whether said variable is assigned a reference value comprises clearing said bit when said variable is assigned a non-reference value.

29. A method of garbage collection comprising:

creating a bit vector in memory;

assigning a bit within said bit vector for each ambiguously typed variable;

maintaining said bit dynamically to indicate whether said variable is assigned a reference value;

scanning said bit vector during garbage collection to determine which ambiguously typed variables contain reference values;

including variables containing reference values in a root set;

traversing said root set to find reachable objects in a first memory region; and reclaiming space occupied by dead objects.

30. The method of claim 29 further comprising allocating space in a second memory region for reachable objects.

31. The method of claim 30 further comprising copying contents of reachable objects to said second memory region.

32. The method of claim 31 further comprising updating memory references pointing to reachable objects in said first memory region to refer to reachable objects in said second memory region.

33. A computer readable medium having embodied thereon a computer program, the computer program being executable by a machine to perform a method comprising:

creating a bit vector in memory to store states of ambiguously typed variables;

assigning a bit within said bit vector for each ambiguously typed variable;

maintaining said bit dynamically to indicate whether said ambiguously typed variable is assigned a reference value;

creating a root set during garbage collection; and traversing said root set to find reachable objects in a first memory region.

34. The computer program of claim 33 wherein creating a root set comprises scanning said bit vector to determine which ambiguously typed variables contain reference values.

35. The computer program of claim 34 further comprising including variables containing reference values into said root set.

36. The computer program of claim 33 further comprising freeing memory space occupied by dead objects.

37. A computer system comprising:

a processor; and a memory coupled to said processor, said memory having stored therein code which when executed by said processor, said code causes said processor to perform a method comprising:

creating a bit vector in memory space;

assigning a bit within said bit vector for each ambiguously typed variable;

maintaining said bit dynamically to indicate whether said variable is assigned a reference value; and scanning said bit vector during garbage collection to determine which ambiguously typed variables contain reference values.

38. The system of claim 37 wherein said method further comprises:

creating a root set during garbage collection;

traversing said root set to find reachable objects in a first memory region; and freeing memory space occupied by dead objects.

39. The system of claim 38 wherein creating a root set comprises scanning said bit vector to determine which ambiguously typed variables contain reference values and including variables containing reference values into said root set.

* * * * *